United States Patent [19]

Stanley

[11] Patent Number: 4,579,593
[45] Date of Patent: Apr. 1, 1986

[54] HEXAHYDROPYRIMIDINES AS ASPHALT EMULSIFIERS AND EMULSIONS CONTAINING HEXADROPYRIMIDINES

[75] Inventor: Keith D. Stanley, Downers Grove, Ill.

[73] Assignee: Akzona Incorporated, Enka, N.C.

[21] Appl. No.: 568,518

[22] Filed: Jan. 6, 1984

Related U.S. Application Data

[63] Continuation of Ser. No. 464,078, Feb. 4, 1983, abandoned.

[51] Int. Cl.$^4$ ............... C08L 95/00; B01J 13/00
[52] U.S. Cl. ............... 106/277; 252/311.5; 544/242
[58] Field of Search ............ 252/311.5; 544/242; 106/277

[56] References Cited

U.S. PATENT DOCUMENTS

| | | | |
|---|---|---|---|
| 2,534,828 | 12/1950 | Mitchell et al. | 544/242 |
| 2,535,747 | 12/1950 | Morey | 544/242 |
| 2,546,169 | 3/1951 | Salvin et al. | 544/242 |
| 3,093,595 | 6/1963 | Levy et al. | 252/311.5 |
| 3,097,179 | 7/1963 | Ceintrey | 252/311.5 |
| 4,001,232 | 1/1977 | Groegler et al. | 544/242 |
| 4,003,718 | 1/1977 | Gattuso | 544/242 |

FOREIGN PATENT DOCUMENTS 2384537 11/1978 France .
109416 10/1974 Japan .

Primary Examiner—Teddy S. Gron
Assistant Examiner—Anne Brookes
Attorney, Agent, or Firm—Francis W. Young; Louis A. Morris

[57] ABSTRACT

A rapid-set asphalt emulsion which comprises at least 60% residue, 30% water, 0.1% acid, and 0.15% of an emulsifier, the emulsifier comprising a hexahydropyrimidine of the general formula:

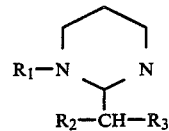

wherein $R_1$ is an alkyl group having from 8 to 18 carbon atoms, and $R_2$ and $R_3$ may be the same or different, and are selected from the group including H— or —$(CH_2)_x CH_3$, wherein x is an integer between 0 and 3.

9 Claims, No Drawings

HEXAHYDROPYRIMIDINES AS ASPHALT EMULSIFIERS AND EMULSIONS CONTAINING HEXADROPYRIMIDINES

This is a continuation of application Ser. No. 464,078 filed Feb. 4, 1983, now abandoned.

BACKGROUND OF THE INVENTION

This invention relates to new and useful oil in water emulsions and to the process for preparing these emulsions. More particularly, this invention relates to the use of a certain class of hexahydropyrimidines as asphalt emulsifiers. The class of hexahydropyrimidines useful in the present invention is advantageous in that it is liquid at room temperatures so as to enable easy handling of the emulsifiers by manufacturers of asphalt emulsions.

Asphalt finds use in a wide variety of applications, including for the paving of road surfaces and for the manufacture of water-proof coatings and protective coatings in general. Generally speaking, asphalt is employed in these applications mainly in the form of a liquid. It is usually melted by heating and applied as a molten mass (hot mix), and combined with volatile organic solvents or "cut backs" to provide liquid solutions of the desired viscosity. Asphalt is also emulsified with water and used in the form of liquid asphalt emulsions.

The so called rapid-set asphalt emulsions require certain special properties. Among the most important is a high viscosity combined with a low residue. Since asphalt emulsions are generally applied by machinery, it is important that the emulsion be of a high viscosity so that it will not flow from the pavement being treated. A sufficiently high residue content, the residue corresponding to the amount of asphalt in the emulsion, is necessary so as to provide for suitable adhesion of the aggregate that is applied to the asphalt. For example, the requirements for cationic emulsified asphalts of the rapid-setting type, according to the specification designated D-2397-79 by the American Society for Testing and Materials (ASTM), requires a minimum of 60% residue in CRS-1 rapid set asphalts and a minimum of 65% residue in CRS-2 asphalts. CRS-1 asphalt is suitable for surface treatment, penetration macadam, sand-seal coat, tack coat, and mulch, whereas CRS-2 is suitable for surface treatment, penetration macadam, and single and multiple coarse aggregate seal coats.

Hexahydropyrimidines are known in the art. For example, U.S. Pat. No. 2,535,747, issued to Glen H. Morey on Dec. 26, 1950, and entitled "Substituted Hexahydropyrimidines and Method for Producing Them", discloses certain hexahydropyrimidines as being useful in chemical intermediates, as for example in the preparation of wetting agents by converting them to the lauric or oleic salts or to quaternary ammonium salts. The reaction product with formaldehyde may also be used in the production of plastics, for example, by reaction with phenol. There is no disclosure of the use of these hexahydropyrimidines in asphalt emulsions.

SUMMARY OF THE INVENTION

It has now been found that a greatly improved, low residue, high viscosity asphalt emulsion is obtained in the composition comprising at least 60% residue, 30% water, 0.1% acid, and 0.15% of an emulsifier, said emulsifier comprising a hexahydropyrimidine of the general formula:

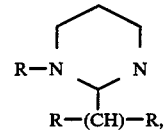

wherein $R_1$ is an alkyl group having from 8 to 18 carbon atoms and $R_2$ and $R_3$ may be the same or different, and are selected from the group including H— or —$(CH_2)_xCH_3$, wherein x is an integer between 0 and 3. The superior new asphalt emulsions of the present invention have remarkably good viscosities at a low residue level. This characteristic is advantageous in that by reducing the amount of asphalt in the oil and water emulsion, manufacturers of these emulsions can lower their costs because the chemicals used to fortify the mix are always less expensive than the asphalt itself. The emulsions have very good stability under storage conditions and do not increase unduly in viscosity or separate on standing.

The present emulsifiers are preferably manufactured from the reaction of a diamine with an aldehyde. Preferably, the diamine will have one long fatty chain, the fatty chain enhancing the product's emulsifying abilities. For example, an emulsifier according to the invention, 1-tallow-2-n-propyl hexahydropyrimidine, may be manufactured by the reaction of N-tallow-1,3-diaminopropane with n-butyraldehyde, in the presence or absence of acetic acid.

Other suitable aldehydes that may be used in the production of the present compounds include acetaldehyde, n-propionaldehyde, pentanaldehyde, and hexanaldehyde. Branched chain aldehydes, such as isobutyraldehyde, may be used in the manufacture of the present compounds as well. For example, using isobutyraldehyde will result in a hexahydropyrimidine of the formula:

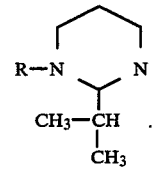

The preferred acid in the manufacture of the present asphalt emulsions is hydrochloric acid; the acids are primarily used to enhance the water-solubility of the emulsifiers. The emulsifier itself may be comprised of the hexahydropyrimidine or it may be comprised of combinations of the hexahydropyrimidine and other amines. The present invention is advantageous in that the novel hexahydropyrimidines are liquids at room temperatures and have been shown to be very effective emulsifiers when used with certain asphalts that have been found very difficult to properly emulsify. These asphalts were previously only emulsifiable by emulsifiers that were solid at room temperature. The liquidity of the present emulsifier at room temperature enables manufacturers of asphalt emulsions to pump the emulsifiers directly into the water and acid mix rather than having to melt them first.

DESCRIPTION OF THE PREFERRED EMBODIMENTS

The manufacture of the present emulsifiers and of emulsions containing those emulsifiers is disclosed by the following examples:

EXAMPLE 1

The present emulsifiers may be manufactured in a one liter round-bottom flask containing a mechanical stirrer and heating mantle, the temperature of the reaction mix being controlled by a Thermowatch® heating mantle temperature controller, model L6-1000B, manufactured by Instruments for Research and Industry, Cheltonham, Pa. To 201.6 grams (0.598 gram moles) of Duomeen® TD aliphatic diamine, a product of the Armak Company, Industrial Chemical Division, 300 S. Wacker Drive, Chicago, Ill. 60606, heated to 53° C., was gradually added to a mixture of 43.1 grams (0.598 gram moles) of butyraldehyde and 0.186 grams (0.0198 gram moles) acetic acid over approximately one hour. Duomeen® TD is Armak's trademark for a distilled grade of N-tallow-1,3-diaminopropane. The reaction was exothermic, and the temperature of the reaction contents rose to about 61° C. After all of the aldehyde was added to the reaction mixture, the mix was allowed to stand for an additional 45 minutes. A sample was removed from the round-bottom flask, and infrared spectrometry showed that there were no C=O bonds remaining in the reaction mix but that a small amount of C=N bonds were present, indicating the presence of N-butylidine tallowimine formed from impurities in the Duomeen TD. An hour and ten minutes after the first infrared spectrometry, another sample was removed from the round bottom flask and subjected to IR analysis. The results of the second IR were similar to those of the first. The contents were then stripped of water with a Buchler rotary evaporator (roto-vac) at 45° C. The resulting product, as indicated by NMR spectroscopy, included 204 grams of a yellow liquid that corresponded to the hexahydropyrimidine having the formula:

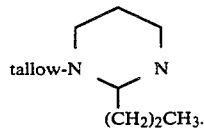

Also remaining was 10.5 grams of a white solid that corresponded to the acetate salt of the product.

EXAMPLE 2

The present hexahydropyrimidine was manufactured in a two-liter, round-bottom, three-neck flask having a mechanical stirrer and a heating mantle and whose temperature was controlled with a Thermowatch® temperature controller. Six hundred fifty-seven point seven grams (1.975 gram moles) Duomeen® T aliphatic diamine was placed in the three-neck flask and heated to 55° C. One hundred and forty-two point four grams (1.975 gram moles) of butyraldehyde and 2.85 grams (0.047 gram moles) of acetic acid were blended, and the aldehyde/acetic acid blend were added dropwise to the aliphatic diamine over the next hour and ten minutes. The reaction was exothermic, and after all the butyraldehyde had been added to the reaction mixture the temperature of that mixture stood at 65° C. One hour after the addition of all of the butyraldehyde, infrared spectrometry disclosed that there were no C=O bonds present but that a small amount of C=N bonds were present. The mixture was later stripped by roto-vac and filtered so as to separate the product from its salt. The product, as indicated by NMR spectroscopy, corresponds to the formula:

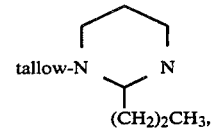

and is known as 1-tallow-2-n-propyl hexahydropyrimidine.

EXAMPLE 3

The present hexahydropyrimidine was manufactured in a one-liter, round-bottom, three-neck flask having a mechanical stirrer and a heating mantle and whose temperature was controlled with a Thermowatch® temperature controller. 263.3 grams (0.791 gram moles) Duomeen® T aliphatic diamine was placed in the three-neck flask and heated to 53° C. 58.2 grams (0.791 gram moles) of isobutyraldehyde and 0.95 grams (0.016 gram moles) of acetic acid were blended, and the aldehyde/acetic acid blend was added dropwise to the aliphatic diamine over the next hour and fourteen minutes. The reaction was exothermic, and after all the isobutyraldehyde had been added to the reaction mixture the temperature of that mixture stood at 54° C. Two hours and seventeen minutes after the addition of all of the isobutyraldehyde, infrared spectrometry disclosed that there were no C=O bonds present but that a substantial amount of C=N bonds were present, corresponding to non-cyclized imine having the structure

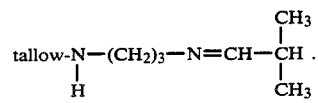

The mixture was later stripped by heating the reaction contents to 90°-100° C. and trapping the condensing water in a Dean-Stark trap. The product, as indicated by NMR spectroscopy, corresponds to the formula:

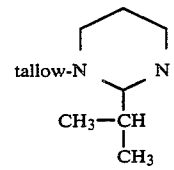

and is known as 1-tallow-2-isopropyl hexahydropyrimidine.

EXAMPLE 4

The present hexahydropyrimidine was manufactured in an autoclave containing 360 grams (1.11 gram moles) of Duomeen T heated to 50° C. Over the next one-half hour, 108 ml of n-butyraldehyde (1.22 gram moles) was pumped into the autoclave, and thereafter the temperature was raised to and maintained at 60° C. for the next 1½ hours. Upon IR analysis the product proved to be a hexahydropyrimidine of the formula:

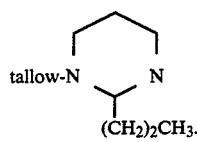

The following examples relate to the use of the hexahydropyrimidine manufactured in accordance with Examples 1 and 2 in asphalt emulsions. After the emulsions were prepared, several tests of their characteristics were carried out as a check upon their quality. The particle charge test is made to identify cationic emulsions. It is performed by immersing a positive electrode (anode) and a negative electrode (cathode) into a sample emulsion and connecting them to a controlled direct-current electrical source. At the end of a specified period, the electrodes are observed to determine if the cathode has an appreciable layer of asphalt deposited on it. All cationic asphalt emulsion particles will be attracted by the cathode. Viscosity, or the asphalt emulsion's resistance to flow, is determined by the Saybolt Furol viscosity test, and the results are reported in Saybolt Furol Seconds. The viscosity test is performed at 50° C. (122° F.).

A sieve test determines the amount of asphalt in the form of rather large globules that could clog the spraying equipment and fail to provide the desired thin and uniform coatings of asphalt on the aggregate particles. In the sieve test, a representative sample of emulsified asphalt is poured through an 850 μm (No. 20) sieve. For cationic emulsions, distilled water is used for rinsing the sieve and the retained asphalt. After rinsing, the sieve and asphalt are dried in an oven and the amount of retained asphalt determined by weighing. An asphalt emulsion which shows no globules in the sieve is referred to as an emulsion showing no shot.

A storage-stability test is used to determine the ability of an emulsified asphalt to remain as a uniform dispersion during storage. It is a measure of the permanence of the dispersion as related to time. Storage stability may be determined visually, as by placing a representative sample of the emulsion in a glass cylinder, stoppering the cylinder and allowing it to stand at laboratory temperatures for 24 hours. A stable emulsion will have a visually constant color from the top to the bottom of the cylinder and will be referred to in the examples below as an emulsion showing no break.

EXAMPLE 5

The emulsifiers manufactured in Example 1 or Example 2 were added to a Shell 120/150 pen asphalt cement. A combination of 65.6% of this Shell asphalt cement, 0.18% 1-tallow-2-n-propyl hexahydropyrimidine, 0.10% hydrochloric acid and 34.12% water yielded an asphalt emulsion having a viscosity of 248 Saybolt Furol Seconds. The particle charge test was positive, indicating a cationic composition, and a sieve test in accordance with the ASTM standard specification D-2397-79 indicated that the rapid-setting emulsions contained less than 0.10% by weight of particulates that did not pass through the sieve.

EXAMPLE 6

An asphalt emulsion having a pH of 2.3 was prepared using 65.6% of a Shell 120/150 pen asphalt cement, 0.10% hydrochloric acid, and 0.18% of an emulsifier prepared by blending 80% by weight of 1-tallow-2-n-propyl hexahydropyrimidine with 20% by weight bis(2-hydroxypropyl)tallowamine, and 34.12% water. The emulsion, after standing for 24 hours, had a viscosity of 337 Saybolt Furol Seconds, and was smooth and creamy with no break and no shot.

What is claimed is:

1. A rapid-set asphalt emulsion which comprises at least 60% asphalt residue, at least 30% water, at least 0.1% acid, and at least 0.15% of an emulsifier that is liquid at room temperature, the emulsifier comprising a hexahydropyrimidine of the general formula:

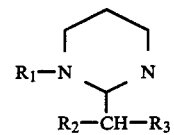

wherein $R_1$ is an alkyl group having from 8 to 18 carbon atoms, and $R_2$ and $R_3$ may be the same or different, and are selected from the group including H— or —$(CH_2)_xCH_3$, wherein x is an integer between 0 and 3.

2. The emulsion as set forth in claim 1, wherein $R_1$ is tallow.

3. The emulsion as set forth in claim 1, wherein $R_2$ is H—, $R_3$ is —$(CH_2)_xCH_3$, and x is 1.

4. The emulsion as set forth in claim 2, wherein $R_2$ is H—, $R_3$ is —$(CH_2)_xCH_3$, and x is 1.

5. The emulsion as set forth in claim 1, wherein said acid is hydrochloric acid.

6. An asphalt emulsion, comprising at least 60% by weight asphalt residue, at least 30% by weight water, at least 0.1% by weight acid, and at least 0.15% by weight of an emulsifier that is liquid at room temperature, said emulsifier comprising:

(a) a hexahydropyrimidine of the general formula:

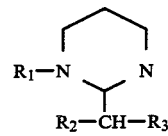

wherein $R_1$ is an alkyl group having from 8 to 18 carbon atoms and $R_2$ and $R_3$ may be the same or different, and are selected from the group including H— or —$(CH_2)_xCH_3$, wherein x is an integer between 0 and 3; and (b) a propoxylated amine.

7. The emulsion as set forth in claim 6, wherein $R_1$ is tallow.

8. The emulsion as set forth in claim 6, wherein said propoxylated amine is bis(2-hydroxypropyl)tallowamine.

9. An asphalt emulsion, comprising at least 60% asphalt residue, at least 30% water, at least 0.1% hydrochloric acid, and at least 0.15% of an emulsifier that is liquid at room temperature, said emulsifier comprising:

(a) 1-tallow-2-n-propyl hexahydropyrimidine; and
(b) bis(2-hydroxypropyl)tallowamine.

* * * * *